United States Patent
Dong et al.

(10) Patent No.: US 9,432,476 B1
(45) Date of Patent: Aug. 30, 2016

(54) PROXY DATA STORAGE SYSTEM MONITORING AGGREGATOR FOR A GEOGRAPHICALLY-DISTRIBUTED ENVIRONMENT

(71) Applicant: EMC Corporation, Hopkinton, MA (US)

(72) Inventors: Dazhi Dong, Shanghai (CN); Surender V. Brahmaroutu, Round Rock, TX (US); Ashutosh Nanekar, Cary, NC (US); Xiaogang Wang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 160 days.

(21) Appl. No.: 14/228,754

(22) Filed: Mar. 28, 2014

(51) Int. Cl.
  *G06F 15/173* (2006.01)
  *H04L 29/08* (2006.01)
  *H04L 29/06* (2006.01)

(52) U.S. Cl.
  CPC ........... *H04L 67/2857* (2013.01); *H04L 67/28* (2013.01); *H04L 67/2814* (2013.01); *H04L 67/2823* (2013.01); *H04L 63/0281* (2013.01)

(58) Field of Classification Search
  CPC .............. H04L 67/28; H04L 67/2814; H04L 67/2823; H04L 67/2833; H04L 63/0281
  See application file for complete search history.

(56) References Cited

U.S. PATENT DOCUMENTS

| | | | | |
|---|---|---|---|---|
| 6,496,914 | B1* | 12/2002 | Sonner | G06F 3/0604 709/220 |
| 2002/0004816 | A1* | 1/2002 | Vange | G06F 9/5027 709/219 |
| 2008/0243847 | A1* | 10/2008 | Rasmussen | G06F 17/30171 707/999.008 |
| 2012/0166611 | A1* | 6/2012 | Kim | H04L 67/125 709/223 |

FOREIGN PATENT DOCUMENTS

WO  2015099554 A1  7/2015

OTHER PUBLICATIONS

Bruce R. Rabe, et al.; "Proficiency-Based GUI Adaptation"; U.S. Appl. No. 13/833,356, filed Mar. 15, 2013.
Norman M. Miles, et al.; "Adaptive GUI Pre-Fetching"; U.S. Appl. No. 13/837,707, filed Mar. 15, 2013.
Donald E. Labaj, et al.; "Dynamically-Configured Dashboard"; U.S. Appl. No. 14/108,979, filed Dec. 17, 2013.
Xiaohua Fan, et al.; "Host Oriented Automatic Verification of Best Practices"; U.S. Appl. No. 14/139,927, filed Dec. 24, 2013.

* cited by examiner

*Primary Examiner* — Patrice Winder
*Assistant Examiner* — Nam Tran
(74) *Attorney, Agent, or Firm* — BainwoodHuang

(57) ABSTRACT

Techniques are described for utilizing proxy data storage system monitoring aggregators, which are able to keep in synchronization with a central data storage system monitoring aggregator to provide distributed access to the aggregated state and performance monitoring data of all of the data storage arrays.

15 Claims, 5 Drawing Sheets

PROXY DATA STORAGE SYSTEM MONITORING AGGREGATOR FOR A GEOGRAPHICALLY-DISTRIBUTED ENVIRONMENT

BACKGROUND

Large enterprises often maintain large distributed data storage systems made up of many data storage arrays connected to a storage area network. Although data storage arrays all run individual management applications, it can be a challenge to monitor the entire distributed data storage system. Thus, some enterprises have deployed a data storage system monitoring aggregator, which is capable of allowing a user to monitor state and performance of all of the data storage arrays in the aggregate via a single aggregator device in communication with all of the data storage arrays.

SUMMARY

Unfortunately, the above-described use of a single data storage system monitoring aggregator suffers from deficiencies. For example, for large data storage systems, the aggregated data from all of the arrays may include large amounts of data. If many users request aggregated data simultaneously, it may overwhelm the single data storage system monitoring aggregator. Furthermore, if there are many geographically-distributed users around the world, transmitting large amounts of aggregated data around the world to the various users may introduce high latencies for users that are far from the single data storage system monitoring aggregator In order to alleviate these deficiencies, it would be desirable to provide proxies to both alleviate the workload on the data storage system monitoring aggregator and to reduce latencies for remote users. Thus, in contrast to the above-described approaches, improved techniques are described for utilizing proxy data storage system monitoring aggregators, which are able to keep in synchronization with a central data storage system monitoring aggregator to provide distributed access to the aggregated state and performance monitoring data of all of the data storage arrays.

One embodiment of the improved techniques is directed to a method of providing remote aggregated access to data storage information for a set of data storage systems, the method performed by a proxy aggregator device (PAD). The method includes (a) receiving, by the PAD, a request from a client via a network connection, the request including a data storage management query regarding the set of data storage systems, (b) in response to receiving the request, filtering locally-cached management data of the set of data storage systems to yield a filtering result, the locally-cached management data of the set of data storage systems having been synchronized between the PAD and remote management data of the set of data storage systems stored at a remote centralized aggregator device (CAD), the remote CAD having obtained the remote management data of the set of data storage systems directly from the set of data storage systems, and (c) in response to filtering, providing the filtering result from the PAD to the client via the network connection.

Other embodiments are directed to a system, a computerized apparatus, and a computer program product for performing methods similar to that described above. For example, a system for providing remote aggregated access to data storage management information is also described. The system includes (1) a plurality of data storage arrays, (2) a centralized aggregator device (CAD) communicatively connected to the set of data storage arrays, and (3) a set of proxy aggregator devices (PADs) communicatively connected to the CAD via a network, each PAD including local storage and a network connection. The CAD is configured to (i) obtain management data of the plurality of data storage arrays from the plurality of data storage arrays and (ii) respond to storage management inquiries regarding the plurality of data storage arrays based on the obtained management data of the plurality of data storage arrays. Each PAD is configured to (A) synchronize, via a storage management query, over the network connection, locally-cached management data of the plurality of data storage arrays between the local storage of the respective PAD and the management data of the plurality of data storage arrays stored at the CAD, (B) receive requests from clients via the network connection, each request including a respective data storage management query regarding the plurality of data storage arrays, (C) in response to receiving the request, filter the locally-cached management data of the set of data storage systems to yield a filtering result, and (D) in response to filtering, provide the filtering result to the client via the network connection.

These embodiments are advantageous because they provide proxied distributed access to the aggregated state and performance monitoring data of all of the data storage arrays with minimal latency and a reduced centralized workload.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to improved techniques for utilizing proxy data storage system monitoring aggregators, which are able to keep in synchronization with a central data storage system monitoring aggregator to provide distributed access to the aggregated state and performance monitoring data of a set of data storage arrays.

Figure 1:
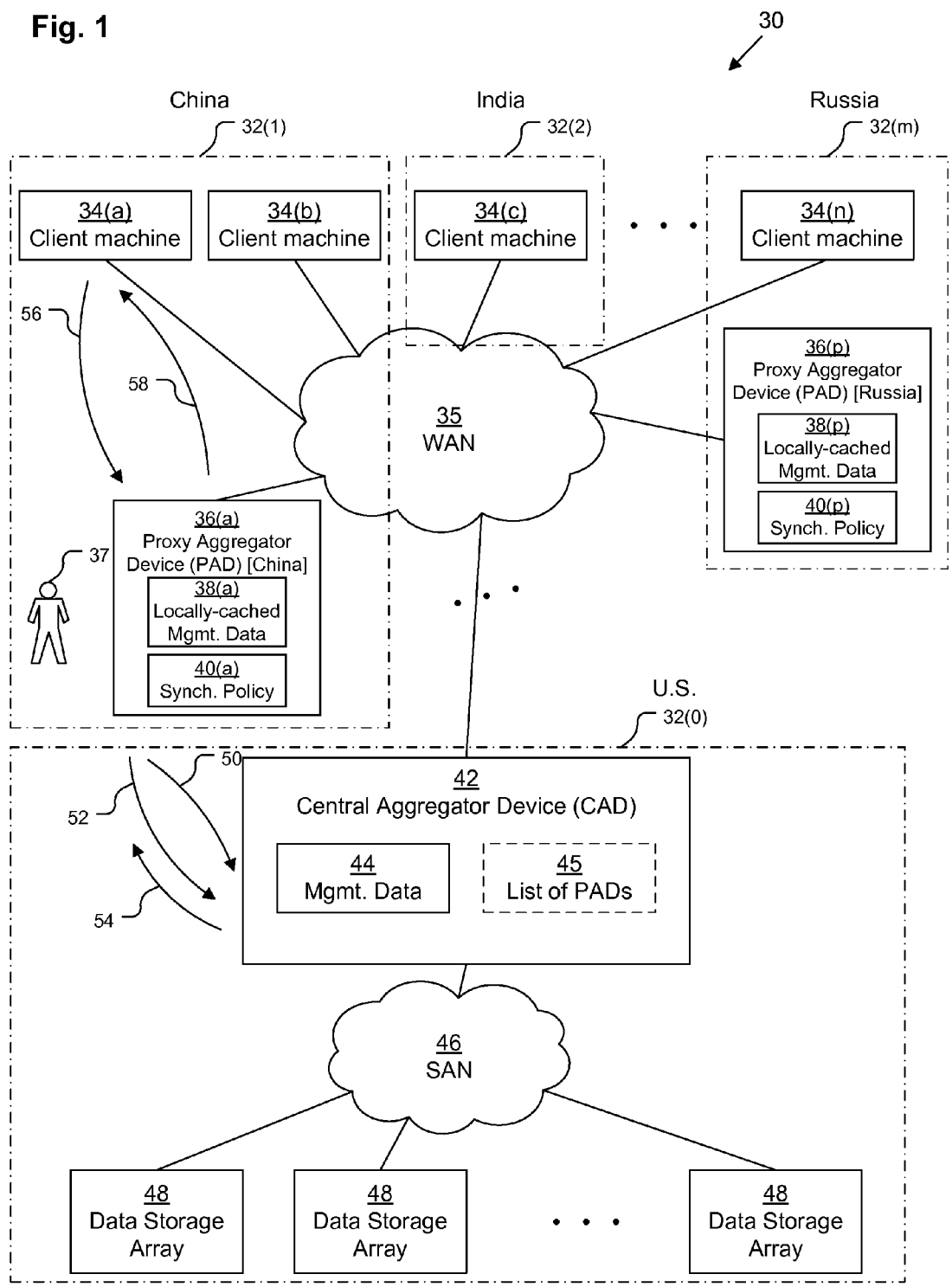
FIG. 1 depicts an example system according to various embodiments.

FIG. 1 depicts an example system 30. System 30 includes a set of management client machines 34 (depicted as client machines 34(a), 34(b), 34(c), . . . , 34(n)), such as, for example, personal computers, workstations, or smart phones, geographically distributed around the world in various countries 32. In the illustrated example, client machines 34(a) and 34(b) are located in China 32(1), client machine 34(c) is located in India 32(2), and client machine 34(n) is located in Russia 32(m). Client machines 34 are all connected to a wide area network (WAN), such as, for example, the Internet.

One or more of the client machines 34 is located within a country 32 (e.g., China 32(1), Russia 32(m)) which also contains a proxy aggregator device (PAD) 36 as part of system 30. Thus, as depicted, PAD 36(a) is located in China and PAD 36(p) is located in Russia 32(m). Each PAD 36(X) stores a respective set of locally-cached management data 38(X) as well as, in some embodiments, a respective synchronization policy 40(X). An administrator 37 is available to configure each PAD 36. It should be understood that there may be several administrators 37, such as, for example, a separate administrator 37 for each country 32.

System 30 also includes a central aggregator device (CAD) 42. CAD 42 is also located in a country 32, typically (and as depicted) within a primary country 32(0) such as the United States. Although not depicted, there may be client machines 34 within the primary country 32(0). CAD 42 connects to a set of data storage arrays 48 via storage area network (SAN) 46. It should be understood that although a SAN is depicted, any other kind of compute network could be used instead of SAN 46. Each data storage array 48 may be, for example, a VNX®, VNXe®, or CLARiiON® CX4 data storage array provided by the EMC Corporation of Hopkinton, Mass. Each data storage array 38 may run storage management software, such as, for example, Unisphere® provided by the EMC Corporation. The CAD 42 may be a server running storage management aggregation software, such as, for example, Unisphere Central™ or Unisphere Remote™ provided by the EMC Corporation.

The primary country 32(0) is a country or other area (e.g., the European Union, South America, etc.) in which the data storage arrays 48 are concentrated and the CAD 42 is located. The significance of a country 32 being a primary country 32(0) is that client machines 34 will typically directly access the CAD 42 rather than proxy through a PAD 36. However, in some embodiments, there may not be a primary country 32(0), in which case, all client machines 34 proxy via a PAD 36 by default.

CAD 42 stores management data 44 regarding the set of data storage arrays 48. Management data 44 may include monitoring information about the various data storage arrays 48, such as, for example, configuration information and performance statistics. In some embodiments, CAD 42 also stores a list 45 of PADs 36 that are active within system 30.

In operation, administrator 37 configures PAD 36(a) for use within China 32(1) by setting up synchronization policy 40(a). At that point, PAD 36(a) may register 50 with CAD 42 so that contact information for PAD 36(a) may be inserted within the list of PADs 45 on the CAD 42. Subsequently, PAD 36(a) requests synchronization 52 (in accordance with synchronization policy 40(a)) to CAD 42, which then responds 54 with the appropriate data selected from the management data 44 in accordance with the synchronization policy 40(a) to be stored as locally-cached management data 38(a) on PAD 36(a). This synchronization 52, 54, may be repeated periodically.

When a user of a client machine 34 (e.g., 34(a)) within a country 32 with a PAD 36 (e.g., China 32(1) having PAD 36(a)) wishes to monitor aspects of the system 30, the client machine 34(a) queries 56 the Chinese PAD 36(a). That PAD 36(a) is able to respond to the query 56 using the locally-cached management data 38(a) so that it can respond 58 with filtered data appropriate to the query. Similar operation (not depicted) occurs in Russia 32(m).

Figure 2:
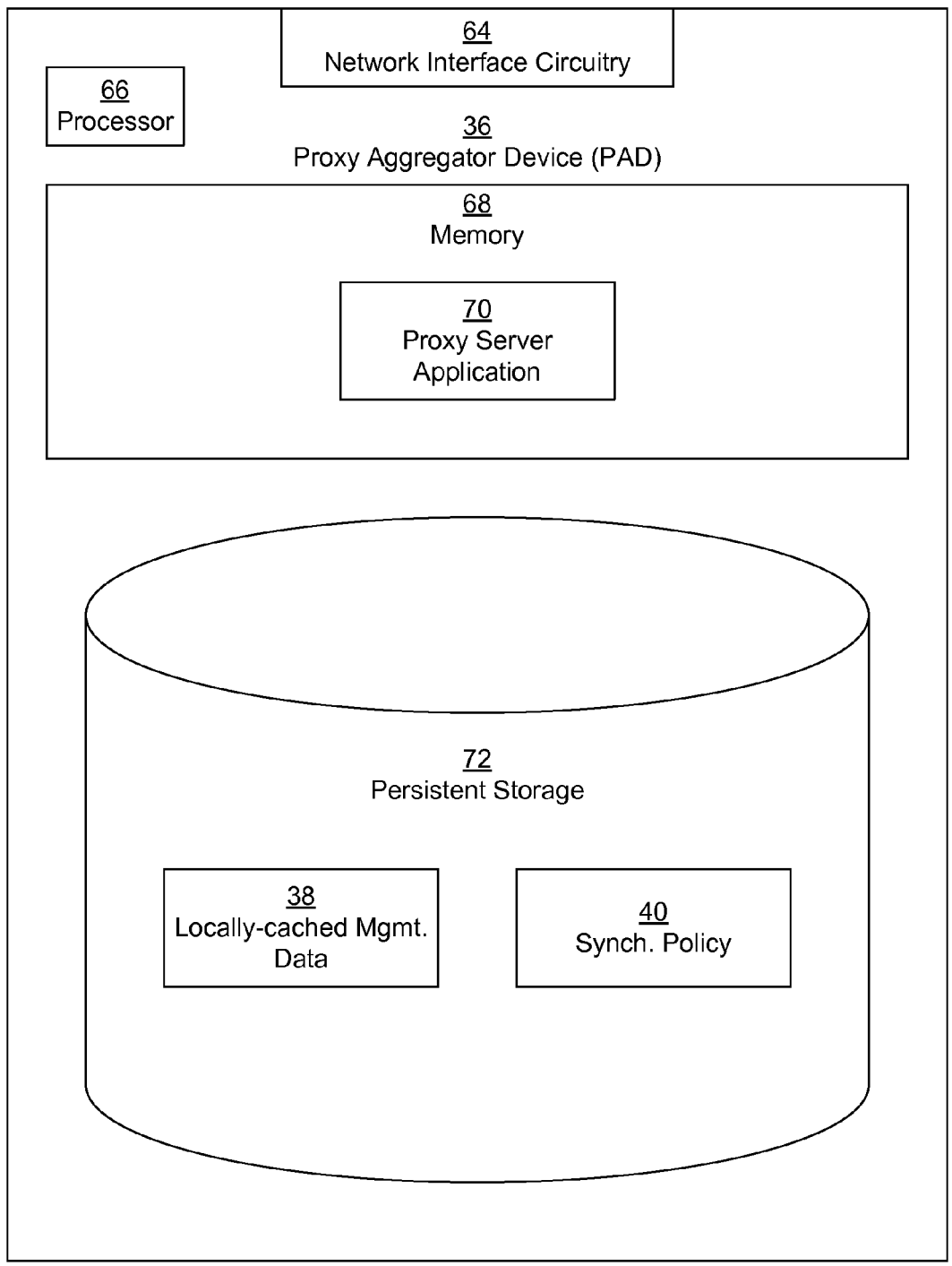
FIG. 2 depicts an example apparatus according to various embodiments.

FIG. 2 depicts an example PAD 36 in further detail. PAD 36 may be any kind of computing device, such as, for example, a personal computer, a workstation computer, a server computer, an enterprise server computer, a laptop computer, a tablet computer, a smart phone, etc. Typically, however, PAD 36 will be a server computer or an enterprise server computer.

PAD 36 includes network interface circuitry 64, a processor 66, memory 68, and persistent storage 72. Network interface circuitry 64 may include one or more Ethernet cards, cellular modems, Wireless Fidelity (WiFi) wireless networking adapters, any other devices for connecting to a network (e.g., WAN 35) or some combination thereof.

Processor 66 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 68 may be any kind of digital system memory, such as, for example, random access memory (RAM). Memory 68 stores an operating system (OS) (not depicted, e.g., Linux, UNIX, Windows, or a similar operating system) and one or more applications executing on processor 66 as well as data used by those programs. Memory 68 stores a proxy server application 70 during execution. Proxy server application 70 executes on processor 66 and interacts with a user on a remote client machine 34 via network interface circuitry 64 as well as administrator 37 and CAD 42.

Storage 72 may be any kind of persistent storage (e.g., solid-state storage and/or disk-based storage) for storing programs (e.g., proxy server application 70, not depicted within persistent storage 72) and data even while PAD 36 is powered off. Persistent storage 72 stores locally-cached management data 38 and synchronization policy 40. In some embodiments, one or both or locally-cached management data 38 and synchronization policy 40 may also be stored in memory 68.

The OS and the applications (e.g., 70) are typically stored both in memory 68 and in persistent storage 72 so that they may be loaded into system memory 68 from persistent storage 72 upon a system restart. An application (e.g., 70), when stored in non-transient form either in system memory 68 or in persistent storage 72, forms a computer program product. The processor 66 running one or more of these applications thus forms a specialized circuit constructed and arranged to carry out the various processes described herein.

Figure 3:
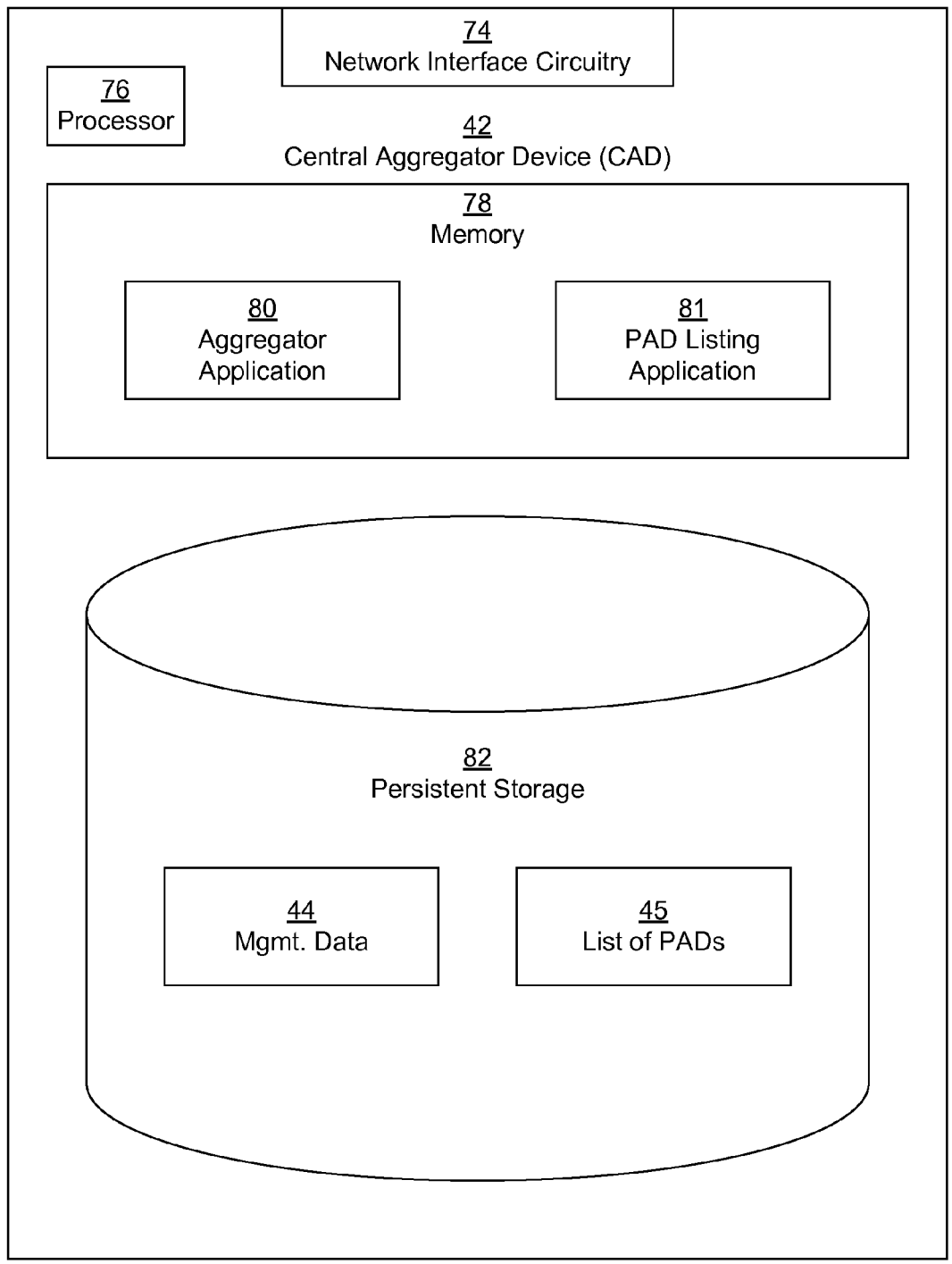
FIG. 3 depicts another example apparatus according to various embodiments.

FIG. 3 depicts an example CAD 42 in further detail. CAD 42 may be any kind of computing device, such as, for example, a personal computer, a workstation computer, a server computer, an enterprise server computer, a laptop computer, a tablet computer, a smart phone, etc. Typically, however, CAD 42 will be a server computer or an enterprise server computer. In some embodiments, CAD 42 may be one of the data storage arrays 48 running specialized software.

CAD 42 includes network interface circuitry 74, a processor 76, memory 78, and persistent storage 82. Network interface circuitry 74 may include one or more Ethernet cards, cellular modems, Wireless Fidelity (WiFi) wireless networking adapters, any other devices for connecting to a network (e.g., WAN 35, SAN 46) or some combination thereof.

Processor 76 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 78 may be any kind of digital system memory, such as, for example, random access memory (RAM). Memory 78 stores an operating system (OS) (not depicted, e.g., Linux, UNIX, Windows, or a similar operating system) and one or more applications executing on processor 76 as well as data used by those programs. Memory 78 stores an aggregator application 80 during execution. In some embodiments, memory 78 also stores a PAD listing application 81 during execution. Aggregator application 80 executes on processor 76 and interacts with data storage arrays 48 and PADs 36. In some embodiments, aggregator application 80 may also interact with client machines 34, when not going through a PAD 36. PAD listing application 81 executes on processor 76 and interacts with PADs 36 and client machines 34.

Storage 82 may be any kind of persistent storage (e.g., solid-state storage and/or disk-based storage) for storing programs (e.g., aggregator application 80 and/or PAD listing application 81, not depicted within persistent storage 82) and data even while CAD 42 is powered off. Persistent storage 82 stores management data 44. In some embodiments, persistent storage also stores the list of PADs 45. In some embodiments, one or both or management data 44 and list of PADs 45 may also be stored in memory 78.

The OS and the applications (e.g., 80, 81) are typically stored both in memory 78 and in persistent storage 82 so that they may be loaded into system memory 78 from persistent storage 82 upon a system restart. An application (e.g., 80, 81), when stored in non-transient form either in system memory 78 or in persistent storage 82, forms a computer program product. The processor 76 running one or more of these applications thus forms a specialized circuit constructed and arranged to carry out the various processes described herein.

Figure 4:
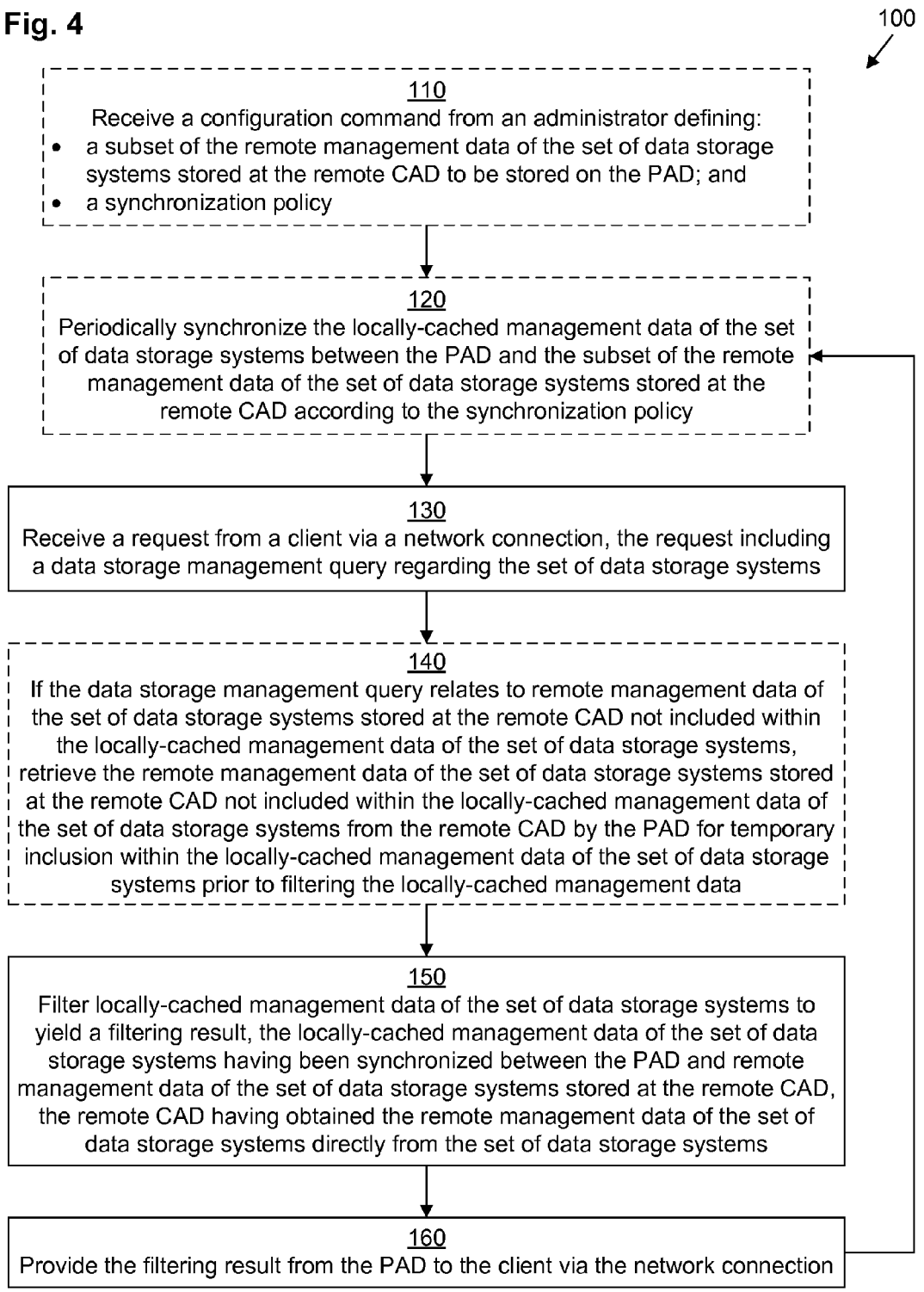
FIG. 4 depicts an example method according to various embodiments.

FIG. 4 depicts an example method 100 according to various embodiments for providing remote aggregated access to data storage information for a set of data storage arrays 48. It should be understood that any time a piece of software, such as, for example, proxy server application 70, aggregator application 80, or PAD listing application 81 is described as performing a method, process, step, or function, in actuality what is meant is that a computing device (e.g., PAD 42, CAD 36) on which that application 70, 80, 81 is running performs the method, process, step, or function when executing that piece of software on its processor 66, 76.

Figure 5:
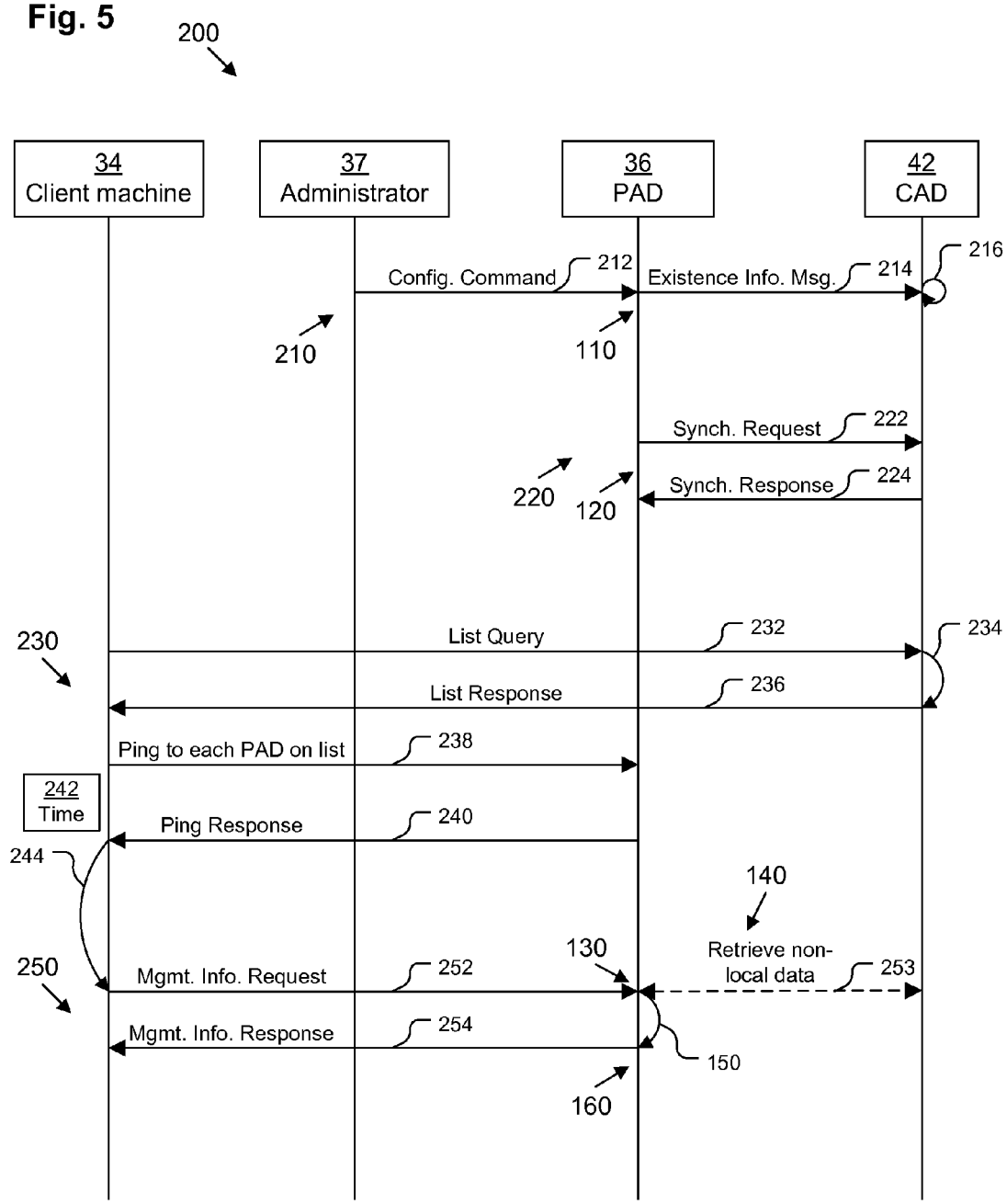
FIG. 5 depicts another example method according to various embodiments.

FIGS. 4 and 5 may best be understood described together. Method 100 (see FIG. 4) is performed by a PAD 36, while method 200 (see FIG. 5) is performed by the system 30.

It should be understood that, within FIG. 4, steps 110, 120, and 140 are dashed because they are optional and not fundamental to method 100.

In step 110 of method 100, proxy server application 70 of a PAD 36, e.g., PAD 36(a), receives a configuration command 212 (see FIG. 5) from administrator 37. The configuration command 212 includes an indication of a subset of the management data 44 of the set of data storage arrays stored at the remote CAD 42 to be stored on the PAD 36(a) and a synchronization policy 40(a), defining a schedule or periodicity at which to synchronize the subset between the locally-cached management data 38(a) and the management data 44. The subset indication (which may be considered to be a part of synchronization policy 40(a) in some embodiments) may indicate that only data regarding certain data storage arrays 48 or regarding certain logical disks is to be stored within locally-cached management data 38(a) on that PAD 36(a). Thus, for example, since PAD 36(a) is located in China 32(1), administrator 37 may indicate within configuration command 212 that only management data concerning logical disks that store data in Chinese or regarding Chinese customers is to be stored within locally-cached management data 38(a) on Chinese PAD 36(a). The configuration command 212 may be a single message provided by the administrator 37, for example, over a network connection or it may be a set of entries made by the administrator 37 into a graphical user interface of the PAD 36(a) or it may be another type of command.

Not depicted within method 100, upon completing step 110, proxy server application 70(a) may, in some embodiments, send an existence information message 214 (see FIG. 5) to CAD 42, so that PAD listing application 81 of the CAD 42 may store 216 existence information regarding the PAD 36(a) within the list of PADs 45. The existence information within existence information message 214 may include, for example, an IP address or domain name of the PAD 36(a) as well as, in some embodiments, an identification of the country 32 (e.g., China 32(1)) in which that PAD 36(a) is located.

Taken together, the administrator 37 sending the configuration command 212, the PAD 36(a) receiving 110 the command, the PAD 36(a) sending the existence information message 214, and the CAD 42 storing 216 the existence information may be considered to be one element 210 of method 200 performed by system 30.

In step 120, the proxy server application 70(a) periodically synchronizes the locally-cached management data 38(a) between the PAD 36(a) and the subset of the remote management data 44 stored at the remote CAD 42 according to the synchronization policy 40(a). This may be accomplished, with reference to FIG. 5, by the PAD 36(a) sending a synchronization request 222 to aggregator application 80 of CAD 42, the aggregator application 80 of CAD 42 responding with a synchronization response 224 containing any data changes that have occurred with respect to the subset of the management data 44 (initially, this may include the entire subset of the management data 44, equivalent to the locally-cached management data 38(a)), and the PAD 36(a) receiving the synchronization response 224 and making appropriate changes to the locally-cached management data 38(a) in response.

The actions performed by the PAD 36(a) in the synchronization make up step 120 of method 100, while the combined synchronization actions performed by the PAD 36(a) and the CAD 42 make up element 220 of method 200 performed by the system 30. Element 220 of method 200 may be repeated multiple times at a periodicity defined by the synchronization policy 40(a) asynchronously with the remaining elements 230, 250 of method 200.

Element 230 of method 200 may be performed by any client machine 34 within system 30. If a particular client machine 34(c) is not pre-assigned to a particular PAD 36, then that client machine 34(c) may locate the closest proxy by way of element 230. Thus, client machine 34(c) may send a list query 232 to the CAD 42 to request the list of PADs 45. PAD listing application 81 of the CAD 42 reads 234 the list of PADs 45 from storage 82 (or, in some embodiments, the list of PADs 45 may be stored within memory 78) and sends a list response 236 back to the client machine 34(c) containing a list of all PADs 36 from the list of PADs 45 (or, in some embodiments, the list response 236 may be filtered to only include certain PADs that are relatively near the requesting client machine 34(c). Thus, if client machine 34(c) is in India 32(2), which does not have its own PAD 36, in one embodiment the list response 236 includes a list of the addresses of all active PADs 36(a), . . . , 36(p), while in another embodiment the list response 236 includes a list of only the PADs 36 located in Asia, e.g., PADs 36(a), 36(p).

Upon receiving the list response 236, client machine 34(c) sends a ping 238 to each PAD 36 from the list response 236. Each such PAD 36 sends a respective ping response 240 back to the client machine 34(c), allowing the client machine 34(c) to time 242 each ping and then select 244 a particular PAD 36, e.g., PAD 36(a), with a fastest response time.

Once the particular PAD 36(a) has been selected, method 200 may proceed to element 250, in which the client machine 34(c) obtains proxied aggregate monitoring data about the system 30. In the case of a client machine 34, e.g., 34(a), which is pre-assigned to a PAD 36(a), element 230 may be omitted altogether from method 200.

In element 250, the client machine 34 sends a management information request 252 to the PAD 36(a). Thus, the proxy server application 70 of the PAD 36(a) is able to receive the management information request 252, the management information request 252 including a data storage management query regarding the set of data storage arrays 48. For example, the management information request 252 may include a query regarding the number of IOs per second of every logical disk storing Chinese data. As another example, the management information request 252 may include a query for the name of every logical disk on every data storage array 48.

If the query is not able to be fulfilled with reference to the locally-cached management data 40(a), then, in some embodiments, PAD 36(a) performs step 140 so that non-local data can be retrieved 253 from the CAD 42 by communication with aggregator application 80. Thus, if the data storage management query relates to remote management data of the set of data storage arrays 48 stored at the remote CAD 42 not included within the locally-cached management data 38(a), the proxy server application 70 of the PAD 36(a) retrieves the relevant remote management data of the set of data storage arrays 48 stored at the remote CAD 42 not included within the locally-cached management data 38(a) from the remote CAD 42 for temporary inclusion within the locally-cached management data 38(a). In other embodiments, if the query is not able to be fulfilled with reference to the locally-cached management data 40(a), then the PAD 36(a) may re-direct the client machine 34 to the CAD 42 for direct fulfillment, bypassing the proxy relationship.

In step 150, the proxy server application 70 of the PAD 36(a) filters the locally-cached management data 38(a) to yield a filtering result, the locally-cached management data 38(a) having been synchronized (see step 120 and element 220) between the PAD 36(a) and remote management data 44 stored at the remote CAD 42, the remote CAD 42 having obtained the remote management data 44 directly from the set of data storage arrays 48. Thus, although the locally-cached management data 38(a) includes all sorts of management monitoring information about the data storage arrays 48 (or possibly a subset), such as configuration information and performance data for all the logical disks of the data storage arrays 48, the filtering result may include only a portion of the locally-cached management data 38(a), such as, for example, only a specific type of performance or configuration data. The filtering result may also only include data regarding a filtered subset of the logical disks covered by the locally-cached management data 38(a), such as, for example, only logical disks within a certain tier of service (e.g., SSD vs. hard disk based).

Finally, in step 150, the proxy server application 70 of the PAD 36(a) provides the filtering result to the client 34 via the network interface circuitry 64 over WAN 35 as management information response 254.

Thus, techniques have been described for utilizing proxy data storage system monitoring aggregators, e.g., PADs 36, which are able to keep in synchronization with a central data storage system monitoring aggregator, e.g., CAD 42, to provide distributed access to the aggregated state and performance monitoring data, e.g., management data 44, of all of the data storage arrays 48.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method of providing remote aggregated access to data storage information for a set of data storage systems, the method performed by a proxy aggregator device (PAD), the method comprising:

receiving, by the PAD, a request from a client via a network connection, the request including a data storage management query regarding the set of data storage systems;

in response to receiving the request, filtering locally-cached management data of the set of data storage systems to yield a filtering result, the locally-cached management data of the set of data storage systems having been synchronized between the PAD and remote management data of the set of data storage systems stored at a remote centralized aggregator device (CAD), the remote CAD having obtained the remote management data of the set of data storage systems directly from the set of data storage systems;

in response to filtering, providing the filtering result from the PAD to the client via the network connection, prior to receiving the request, receiving a configuration command, the configuration command defining:

a subset of the remote management data of the set of data storage systems stored at the remote CAD to be stored on the PAD; and a synchronization policy; and periodically synchronizing the locally-cached management data of the set of data storage systems between the PAD and the subset of the remote management data of the set of data storage systems stored at the remote CAD according to the synchronization policy.

2. The method of claim 1 wherein the method further comprises, in response to receiving the configuration command, sending a signal to the remote CAD informing the remote CAD of the existence of the PAD.

3. The method of claim 1 wherein periodically synchronizing the locally-cached management data of the set of data storage systems between the PAD and the subset of the remote management data of the set of data storage systems stored at the remote CAD according to the synchronization policy includes:

at a frequency defined by the synchronization policy, sending a query from the PAD to the remote CAD requesting the subset of the remote management data stored at the remote CAD;

in response to sending the query, receiving, by the PAD, the subset of the remote management data stored at the remote CAD from the remote CAD; and in response to receiving, storing the received subset of the remote management data stored at the remote CAD as the locally-cached management data of the set of data storage systems within local storage of the PAD.

4. The method of claim 1 wherein the method further includes, conditioned upon the data storage management query relating to remote management data of the set of data storage systems stored at the remote CAD not included within the locally-cached management data of the set of data storage systems, retrieving the remote management data of the set of data storage systems stored at the remote CAD not included within the locally-cached management data of the set of data storage systems from the remote CAD by the PAD for temporary inclusion within the locally-cached management data of the set of data storage systems prior to filtering the locally-cached management data.

5. The method of claim 1 wherein the data storage management query relates to one of configuration information and performance statistics of the set of data storage systems.

6. A computer-readable medium comprising a non-transitory computer-readable storage medium storing instructions, which, when executed by a computer, cause the computer to provide proxied remote aggregated access to data storage information for a set of data storage systems by performing the following operations:

receiving a request from a client via a network connection of the computer, the request including a data storage management query regarding the set of data storage systems;

in response to receiving the request, filtering locally-cached management data of the set of data storage systems to yield a filtering result, the locally-cached management data of the set of data storage systems having been synchronized between the computer and remote management data of the set of data storage systems stored at a remote centralized aggregator device (CAD), the remote CAD having obtained the remote management data of the set of data storage systems directly from the set of data storage systems;

in response to filtering, providing the filtering result to the client via the network connection;

prior to receiving the request, receiving a configuration command, the configuration command defining:

a subset of the remote management data of the set of data storage systems stored at the remote CAD to be stored on the PAD; and a synchronization policy; and periodically synchronizing the locally-cached management data of the set of data storage systems between the PAD and the subset of the remote management data of the set of data storage systems stored at the remote CAD according to the synchronization policy.

7. The computer-readable medium of claim 6 wherein the instructions, when executed by the computer, further cause the computer to, in response to receiving the configuration command, send a signal to the remote CAD informing the remote CAD of the existence of the PAD.

8. The computer-readable medium of claim 6 wherein the instructions for periodically synchronizing the locally-cached management data of the set of data storage systems between the PAD and the subset of the remote management data of the set of data storage systems stored at the remote CAD according to the synchronization policy, when executed by the computer, cause the computer to perform the following operations:

at a frequency defined by the synchronization policy, sending a query from the PAD to the remote CAD requesting the subset of the remote management data stored at the remote CAD;

in response to sending the query, receiving, by the PAD, the subset of the remote management data stored at the remote CAD from the remote CAD; and in response to receiving, storing the received subset of the remote management data stored at the remote CAD as the locally-cached management data of the set of data storage systems within local storage of the PAD.

9. The computer-readable medium of claim 6 wherein the instructions, when executed by the computer, further cause the computer to, conditioned upon the data storage management query relating to remote management data of the set of data storage systems stored at the remote CAD not included within the locally-cached management data of the set of data storage systems, retrieve the remote management data of the set of data storage systems stored at the remote CAD not included within the locally-cached management data of the set of data storage systems from the remote CAD by the PAD for temporary inclusion within the locally-cached management data of the set of data storage systems prior to filtering the locally-cached management data.

10. A system for providing remote aggregated access to data storage management information, the system comprising:

a plurality of data storage arrays;

a centralized aggregator device (CAD) communicatively connected to the set of data storage arrays, the CAD being configured to:

obtain management data of the plurality of data storage arrays from the plurality of data storage arrays; and respond to storage management inquiries regarding the plurality of data storage arrays based on the obtained management data of the plurality of data storage arrays;

a set of proxy aggregator devices (PADs) communicatively connected to the CAD via a network, each PAD including local storage and a network connection, each PAD being configured to:

synchronize, via a storage management query, over the network connection, locally-cached management data of the plurality of data storage arrays between the local storage of the respective PAD and the management data of the plurality of data storage arrays stored at the CAD;

receive requests from clients via the network connection, each request including a respective data storage management query regarding the plurality of data storage arrays;

in response to receiving each request, filter the locally-cached management data of the set of data storage arrays to yield a filtering result;

in response to filtering, provide the filtering result to the client via the network connection;

prior to receiving the requests, receive a configuration command, the configuration command defining:
  a subset of the management data of the set of data storage arrays stored at the CAD to be stored on the PAD; and
  a synchronization policy; and periodically synchronize the locally-cached management data of the set of data storage arrays between the PAD and the subset of the management data of the set of data storage systems stored at the CAD according to the synchronization policy.

11. The system of claim 10 wherein each PAD is configured to, when periodically synchronizing the locally-cached management data of the set of data storage arrays between the PAD and the subset of the management data of the set of data storage systems stored at the remote CAD according to the synchronization policy:
  at a frequency defined by the synchronization policy, sending a query from the PAD to the CAD requesting the subset of the management data stored at the remote CAD;
  in response to sending the query, receiving, by the PAD, the subset of the management data stored at the CAD from the CAD; and
  in response to receiving, storing the received subset of the management data stored at the CAD as the locally-cached management data of the set of data storage arrays within local storage of the PAD.

12. The system of claim 10 wherein each PAD is further configured to, conditioned upon the data storage management query relating to management data of the set of data storage arrays stored at the CAD not included within the locally-cached management data of the set of data storage arrays, retrieving the management data of the set of data storage arrays stored at the CAD not included within the locally-cached management data of the set of data storage arrays from the CAD by the PAD for temporary inclusion within the locally-cached management data of the set of data storage arrays prior to filtering the locally-cached management data.

13. A system for providing remote aggregated access to data storage management information, the system comprising:
  a plurality of data storage arrays;
  a centralized aggregator device (CAD) communicatively connected to the set of data storage arrays, the CAD being configured to:
    obtain management data of the plurality of data storage arrays from the plurality of data storage arrays; and
    respond to storage management inquiries regarding the plurality of data storage arrays based on the obtained management data of the plurality of data storage arrays;
  a set of proxy aggregator devices (PADs) communicatively connected to the CAD via a network, each PAD including local storage and a network connection, each PAD being configured to:
    synchronize, via a storage management query, over the network connection, locally-cached management data of the plurality of data storage arrays between the local storage of the respective PAD and the management data of the plurality of data storage arrays stored at the CAD;
    receive requests from clients via the network connection, each request including a respective data storage management query regarding the plurality of data storage arrays;
    in response to receiving each request, filter the locally-cached management data of the set of data storage arrays to yield a filtering result; and
    in response to filtering, provide the filtering result to the client via the network connection;
  wherein the CAD is further configured to:
    store a list of the set of PADs; and
    in response to a query from a client, returning, via the network connection, contact details for the set of PADs to the client, the client being configured to select a particular PAD from the set of PADs.

14. The system of claim 13 wherein the client is further configured to select the particular PAD by evaluating response times from the set of PADs and selecting a PAD with a fastest response time.

15. The system of claim 13 wherein the system further comprises the client and the client is configured to:
  query the CAD for the contact details for the set of PADs;
  in response to querying, receive the contact details for the set of PADs from the CAD;
  contact each PAD using the respective contact details for that PAD, maintaining a response time for each PAD; and
  select the particular PAD by choosing the PAD with a fastest response time.

* * * * *